(12) United States Patent
Nagata et al.

(10) Patent No.: US 10,270,501 B2
(45) Date of Patent: Apr. 23, 2019

(54) MOBILE STATION, RADIO BASE STATION, AND RADIO COMMUNICATION METHOD

(71) Applicant: NTT DOCOMO, INC., Tokyo (JP)

(72) Inventors: Satoshi Nagata, Tokyo (JP); Yuichi Kakishima, Palo Alto, CA (US); Chongning Na, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/564,810

(22) PCT Filed: Apr. 8, 2016

(86) PCT No.: PCT/JP2016/061614
§ 371 (c)(1),
(2) Date: Oct. 6, 2017

(87) PCT Pub. No.: WO2016/163543
PCT Pub. Date: Oct. 13, 2016

(65) Prior Publication Data
US 2018/0109301 A1   Apr. 19, 2018

(30) Foreign Application Priority Data

Apr. 9, 2015 (CN) .......................... 2015 1 0166472

(51) Int. Cl.
*H04B 7/08* (2006.01)
*H04B 7/0456* (2017.01)

(52) U.S. Cl.
CPC ......... *H04B 7/0456* (2013.01); *H04B 7/0469* (2013.01); *H04B 7/0478* (2013.01); *H04B 7/08* (2013.01)

(58) Field of Classification Search
CPC .. H04B 7/0456; H04B 7/0469; H04B 7/0478; H04B 7/08
See application file for complete search history.

(56) References Cited

U.S. PATENT DOCUMENTS 8,737,509 B2   5/2014 Yu et al.
9,838,106 B2 * 12/2017 Liu ...................... H04B 7/0626
(Continued)

FOREIGN PATENT DOCUMENTS

JP   2014-531144 A   11/2014
WO   2010/079748 A1   7/2010

OTHER PUBLICATIONS

International Search Report issued in corresponding application No. PCT/JP2016/061614 dated Jun. 28, 2016 (4 pages).
(Continued)

*Primary Examiner* — Janice N Tieu
(74) *Attorney, Agent, or Firm* — Osha Liang LLP (57) ABSTRACT

According to an aspect of the present invention, a mobile station, which carries out communication using a plurality of antenna ports, includes a receiving section configured to receive, from a radio base station, first-amount information that indicates a number of antenna ports in a first dimension, and second-amount information that indicates a number of antenna ports in a second dimension; and a transmitting section configured to transmit, to the radio base station, a precoding matrix codebook index that is obtained using the first-amount information and/or the second-amount information. Accordingly, a mobile station, a radio base station and a radio communication method can be provided in which a precoding matrix for a two-dimensional antenna array can be generated with flexibility.

10 Claims, 5 Drawing Sheets

(56) References Cited

U.S. PATENT DOCUMENTS

| 9,999,074 B2* | 6/2018 | Moon .................. H04B 7/0626 |
| 2013/0308715 A1 | 11/2013 | Nam et al. |
| 2014/0016549 A1 | 1/2014 | Novlan et al. |
| 2014/0177745 A1 | 6/2014 | Krishnamurthy et al. |
| 2014/0192762 A1 | 7/2014 | Li et al. |
| 2015/0049824 A1* | 2/2015 | Kim ..................... H04B 7/0456 |
| | | 375/267 |

OTHER PUBLICATIONS

Written Opinion of the International Searching Authority issued in corresponding application No. PCT/JP2016/061614 dated Jun. 28, 2016 (4 pages).

Extended European Search Report issued in corresponding European Patent Application No. 16776709.4, dated Nov. 6, 2018 (11 pages).

\* cited by examiner

MOBILE STATION, RADIO BASE STATION, AND RADIO COMMUNICATION METHOD

TECHNICAL FIELD

The present invention relates to a method of generating a precoding matrix, a radio base station and a mobile station. More specifically, the present invention configures a method of generating a precoding matrix, a radio base station and a mobile station for a multi-input multi-output (MIMO) system.

BACKGROUND ART

In MIMO technology, the capacity of a radio network is improved by providing a plurality of antennas and carrying out data transmission via diversity or a multiplexing scheme. In a conventional communication system, normally a plurality of antennas are arranged in a one-dimensional array in a radio base station, and a plurality of user terminals (UEs) are able to be distinguished in the horizontal dimension. For example, in a radio base station, four emission antennas may be provided in order to simultaneously carry out communication with a plurality of UEs, and the four emission antennas may be arranged in a 4×1 one-dimensional array.

However, for example, in a three-dimensional cell environment of macrocells and small cells, etc., the UEs are positioned at different heights; for example, a plurality of UEs distributed on different floors of a building. In such a case, it is difficult for a pre-existing linear array, in which a plurality of UEs are separated only in the horizontal dimension, to correctly separate the plurality of UEs that are positioned at different heights. In view of this issue, a two-dimensional antenna array has been proposed, thereby enabling enhancement in spatial diversity in the vertical dimension.

A conventional method of generating a precoding matrix relates to a one-dimensional antenna array. For example, the latest 3GPP specifications assume the plurality of antennas provided in the radio base station to be distributed in a uniform linear array (ULA), and codebooks for the precoding matrix have been determined based on this assumption. In addition, different one-dimensional arrays have been proposed, and precoding matrix codebooks have been respectively proposed for these different one-dimensional arrays. For example, in Rel. 8 of the 3GPP specifications, a precoding matrix codebook has been proposed in regard to a 2×1 one-dimensional antenna array; in Rel. 10, a precoding matrix codebook has been proposed in regard to a 8×1 one-dimensional antenna array; and in Rel. 12, a precoding matrix codebook has been proposed in regard to a 4×1 one-dimensional antenna array. However, the configuration schemes of the precoding matrix codebooks for these different one-dimensional antenna arrays are not the same, thereby being disadvantageous in regard to flexibility in arranging antenna arrays.

SUMMARY OF INVENTION

Technical Problem

In view of the above-described problem, there is a demand for a mobile station, a radio base station and a radio communication method to be provided in which a precoding matrix for a two-dimensional antenna array can be generated with flexibility.

Solution to Problem

According to an aspect of the present invention, a mobile station is provided, which carries out communication using a plurality of antenna ports, the mobile station including a receiving section configured to receive, from a radio base station, first-amount information that indicates a number of antenna ports in a first dimension, and second-amount information that indicates a number of antenna ports in a second dimension; and a transmitting section configured to transmit, to the radio base station, a precoding matrix codebook index that is obtained using the first-amount information and/or the second-amount information. Furthermore, the receiving section can receive first sampling rate information that indicates a sampling rate of a beam transmitted in the first dimension, and second sampling rate information that indicates a sampling rate of a beam transmitted in the second dimension, and wherein the precoding matrix codebook index can be obtained using the first sampling rate information and the second sampling rate information, in addition to using the first-amount information and/or the second-amount information. Furthermore, the transmitting section can transmit a first precoding matrix codebook index that corresponds to the first dimension, a second precoding matrix codebook index that corresponds to the second dimension, and a third precoding matrix codebook index. Note that the first dimension can be a horizontal dimension of an antenna array of the radio base station, and the second dimension can be a vertical dimension of an antenna array of the radio base station.

According to an embodiment of the present invention, a method of generating a precoding matrix is provided, the method being applied to a radio base station, wherein an antenna array is provided in the radio base station. The method includes transmitting information on a total number of antenna ports, horizontal number information and/or vertical number information to a mobile station, wherein the information on the total number of antenna ports indicates a total number of antenna ports of the antenna array, the horizontal number information indicates the number of antenna ports in a horizontal dimension of the antenna array, and the vertical number information indicates the number of antenna ports in a vertical dimension of the antenna array. The radio base station receives a horizontal precoding index, a vertical precoding index, and a polarization precoding index from the mobile station. A precoding matrix is generated for the mobile station in accordance with the received horizontal precoding index, the vertical precoding index, and the polarization precoding index.

According to another embodiment of the present invention, a method of generating a precoding matrix is provided, the method being applied to a mobile station. The method includes receiving information on a total number of antenna ports, horizontal number information and/or vertical number information from a radio base station, wherein the information on the total number of antenna ports indicates a total number of antenna ports of the antenna array, horizontal number information indicates the number of antenna ports in a horizontal dimension of the antenna array, and the vertical number information indicates the number of antenna ports in a vertical dimension of the antenna array; determining an antenna array to be used in the radio base station in accordance with the received information on the total number of antenna ports, horizontal number information and/or vertical number information; generating a horizontal precoding matrix codebook, a vertical precoding matrix codebook, and a polarized precoding matrix codebook in accordance with the decided antenna array; and generating a precoding matrix for the mobile station in accordance with the generated horizontal precoding matrix codebook, the vertical precoding matrix codebook, and the polarized precoding matrix codebook.

According to another embodiment of the present invention, a radio base station, in which an antenna array is arranged, is provided, wherein the radio base station includes a transmitting section configured to transmit information on a total number of antenna ports, horizontal number information and/or vertical number information to a mobile station, wherein the information on the total number of antenna ports indicates a total number of antenna ports of the antenna array, horizontal number information indicates the number of antenna ports in a horizontal dimension of the antenna array, and the vertical number information indicates the number of antenna ports in a vertical dimension of the antenna array; a receiving section configured to receive a horizontal precoding index, a vertical precoding index, and a polarization precoding index from the mobile station; and a precoding generating section configured to generate a precoding matrix for the mobile station in accordance with the received horizontal precoding index, the vertical precoding index, and the polarization precoding index.

According to another embodiment of the present invention, a mobile station is provided, the mobile station including a receiving section configured to receive information on a total number of antenna ports, horizontal number information and/or vertical number information to from a radio base station, wherein the information on the total number of antenna ports indicates a total number of antenna ports of the antenna array, horizontal number information indicates the number of antenna ports in a horizontal dimension of the antenna array, and the vertical number information indicates the number of antenna ports in a vertical dimension of the antenna array; an array deciding section configured to decide an antenna array to be used in the radio base station in accordance with the received information on the total number of antenna ports, horizontal number information and/or vertical number information; codebook generating section configured to generate a horizontal precoding matrix codebook, a vertical precoding matrix codebook, and a polarized precoding matrix codebook in accordance with the decided antenna array; and a precoding matrix generating section configured to generate a precoding matrix for the mobile station in accordance with the generated horizontal precoding matrix codebook, the vertical precoding matrix codebook, and the polarized precoding matrix codebook.

Technical Advantageous of Invention

According to the solution of the embodiment of the present invention, a method is proposed for generating a precoding matrix for a two-dimensional antenna array, and this method of generating a precoding matrix can be applied to antenna arrays that are provided according to different arrangement schemes. Accordingly, according to the solution of the embodiment of the present invention, a mobile station, i.e., a UE, can flexibly generate a codebook in accordance with the antenna arrangement of the radio base station, whereby it is not necessary to determine a fixed method for generating precoding matrixes for different antenna arrangements, respectively.

DESCRIPTION OF EMBODIMENTS

The following is a description of a desirable embodiment of the present invention while referencing the drawings. In the present specification and drawings, fundamentally, the same steps and elements are indicated in the drawings with the same designators, and it should be noted that duplicate interpretations of these steps and elements are omitted.

Figure 1:
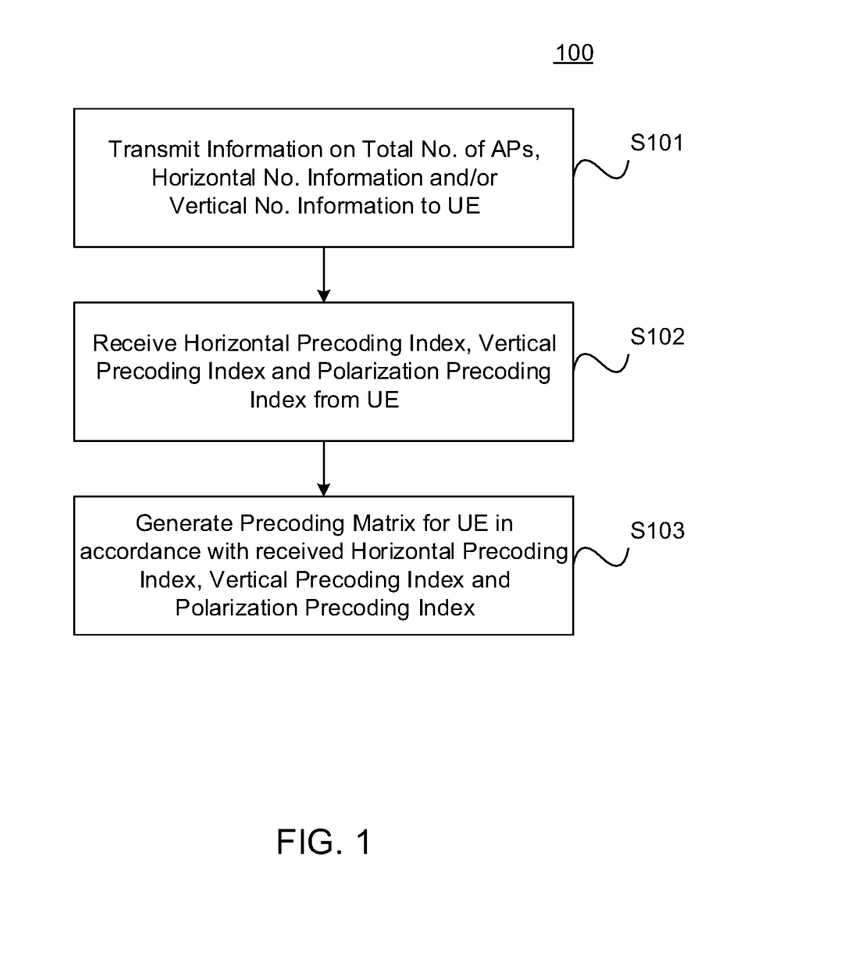
FIG. 1 is a flowchart of a method of generating a precoding matrix, according to an embodiment of the present invention.

FIG. 1 is a flowchart describing a precoding matrix generating method 100, according to the an embodiment of the present invention. The precoding matrix generating method 100 can be applied to a radio base station. In the embodiment of the present invention, an antenna array is provided in a radio base station, and diversity is carried out in a spatial region in the horizontal dimension and/or the vertical dimension. Hereinbelow, the precoding matrix generating method 100, according to the embodiment of the present invention, will be described with reference to FIG. 1.

As shown in FIG. 1, a radio base station notifies a UE of the arrangement scheme of the antenna array in the radio base station. Specifically, in step S101, information on the total number of antenna ports (APs), horizontal number information and vertical number information are transmitted to the UE. The information on the total number of antenna ports indicates the total number of antenna ports of the antenna array. The horizontal number information indicates the number of antenna ports in the horizontal dimension of the antenna array. The vertical number information indicates the number of antenna ports in the vertical dimension of the antenna array.

The horizontal number information may be the number of antenna ports in the horizontal dimension of the antenna array, and the vertical number information may be the number of antenna ports in the vertical dimension of the antenna array. For example, the radio base station may be provided with a 4×2 two-dimensional antenna array arrangement, in which 4 APs are arranged in the horizontal dimension, and 2 APs are arranged in the vertical dimension. In such a case, according to step S101, information on the total number of APs having a value "8", horizontal number information having a value "4" and/or vertical number information having a value "2" are transmitted to the UE.

According to an example of the present invention, the information on the total number of APs, the horizontal number information and the vertical number information are transmitted to the UE. Furthermore, in another example of the present invention, information on the total number of APs, and one of the horizontal number information and the vertical number information are transmitted to the UE. The UE, first of all, calculates the other of the horizontal number information and the vertical number information in accordance with the received information, and determines the antenna arrangement of the radio base station.

According to an example of the present invention, in step S101, the information on the total number of APs and the horizontal number information and/or the vertical number information are periodically or aperiodically notified via RRC signaling to the UE, which is connected to the radio base station. For example, the information elements (IEs) are increased in "CSI-Config" of the RRC signaling in order to notify the above information. However, since the radio base station normally transmits the RRC signaling at a period of 100 ms, which is a long transmission period, sometimes a case arises where the UE's needs cannot be timely met. In view of this issue, according to one example of the present invention, in step S101, the information on the total number of APs and the horizontal number information and/or the vertical number information may be notified by triggered physical layer signaling. Since this physical layer signaling can be triggered as necessary, the radio base station has more flexibility in notifying the UE. For example, the above information can be notified in DCI physical layer signaling which is triggered for A-CSI.

Furthermore, alternatively, the horizontal number information and/or the vertical number information may be release information of a communication standard that is used by the radio base station. The UE determines an antenna array arrangement used in a radio base station in accordance with the release information of the communication standard. Optionally, the radio base station notifies the UE of the information on the total number of APs of the radio base station and the release information of the communication standard used therein, in accordance with a new PMI feedback configuration signaling. For example, in the case where four antennas are provided in the radio base station and communication is carried out using Rel. 12 of the 3GPP specifications, in step S101, a new PMI feedback configuration signaling, "alternativeCodeBookEnabledFor4TX-r12", is notified to the UE. This signaling indicates that the radio base station uses Rel. 12 of the 3GPP specifications, and that the total number of APs is 4. According to this signaling, the UE can know that the total number of antenna ports in the antenna array provided in the radio base station is 4, and that these four antennas are arranged in a method defined in Rel. 12. Therefore, an arrangement scheme of the antenna array in the radio base station can be determined; in other words, in accordance with Rel. 12, an antenna array having a 4×1 one-dimensional array in the radio base station can be determined.

The corresponding relationship between the precoding matrix codebook and the arrangement scheme of the antenna array in the radio base station may be preconfigured. The UE generates, in accordance with the antenna array arrangement scheme that is determined in the radio base station, a precoding matrix codebook corresponding to this antenna array arrangement scheme.

Furthermore, the UE, in accordance with the precoding matrix codebook, generates the precoding matrix to be used in the UE, and feeds back an indicated precoding matrix index to the radio base station; accordingly, the radio base station determines a precoding matrix for the UE to use in accordance with this index. As shown in FIG. 1, in step S102, a horizontal precoding index, a vertical precoding index, and a polarization precoding index are received from the UE. Furthermore, in step S103, a precoding matrix is generated for the UE in accordance with the received horizontal precoding index, the vertical precoding index and the polarization precoding index. According to an example of the present invention, the precoding matrix codebooks that are preconfigured in the radio base station and the UE, respectively, are generated in accordance with a horizontal precoding matrix codebook, a vertical precoding matrix codebook, and a polarization precoding matrix codebook. A precoding matrix is generated by the horizontal precoding index, the vertical precoding index and the polarization precoding index respectively indicating, in the UE, a horizontal precoding matrix, a vertical precoding matrix and a polarization precoding matrix that are selected from the horizontal precoding matrix codebook, the vertical precoding matrix codebook and the polarization precoding matrix codebook, respectively, when the precoding matrix is generated.

Furthermore, according to an example of the present invention, an antenna array can emit a plurality of beams in the vertical dimension; in other words, a plurality of vertical beams can be emitted. The vertical precoding index may be an index for a vertical precoding matrix, corresponding to a vertical beam having the greatest antenna gain out of a plurality of vertical beams detected by the UE. Optionally, the radio base station can determine, in accordance with predetermined information, only at least one vertical beam out of the plurality of vertical beams to use to transmit signals to the UE. In this case, it is desirable for the beam selected by the radio base station to be notified to the UE, whereby operations to be carried out by the UE can be simplified due to the UE only examining the vertical beam that is selected by the radio base station.

Specifically, the method 100 shown in FIG. 1 also includes determining a first amount of vertical beams, for transmission with the UE, out of a plurality of vertical beams that can be emitted in an antenna array, and notifying the UE of first-amount information that indicates the first amount; accordingly, the UE determines the vertical precoding index in accordance with the first amount of vertical beams. The first-amount information may be the determined first amount of vertical beams for communicating with the UE. Alternatively, the first-amount information can include the total number of vertical beams in the antenna array that can emit and a sampling rate of the vertical beams without directly indicating the first amount. Accordingly, the UE determines the vertical beams to communicate with the UE in accordance with the total number of vertical beams and the sampling rate of the vertical beams. For example, the total number of vertical beams that can emit in the antenna array can be 10. The radio base station can determine five vertical beams to use out of ten vertical beams, in accordance with predetermined information, to carry out signal transmission with the UE. In such a case, the first-amount information may be a first amount 5, the total number of vertical beams may be 10, and the sampling rate may be 2, with respect to the vertical beams.

Furthermore, similar to the vertical beams, according to another example of the present invention, an antenna array can emit a plurality of beams in the horizontal dimension; in other words, a plurality of horizontal beams can be emitted. The horizontal precoding index may be an index for a horizontal precoding matrix, corresponding to a horizontal beam having the greatest antenna gain out of a plurality of horizontal beams detected by the UE. Optionally, the radio base station can determine, in accordance with predetermined information, only at least one horizontal beam out of the plurality of horizontal beams to use to transmit signals to the UE. In this case, it is desirable for the beam selected by the radio base station to be notified to the UE, whereby operations to be carried out by the UE can be simplified due to the UE only examining the horizontal beam that is selected by the radio base station.

Specifically, the method 100 shown in FIG. 1, further includes determining a second amount of horizontal beams, for transmission with the UE, out of a plurality of horizontal beams that can be emitted in an antenna array, and notifying the UE of second-amount information that indicates the second amount; accordingly, the UE determines the horizontal precoding index in accordance with the second amount of horizontal beams. The second-amount information may be the determined second amount of horizontal beams for communicating with the UE. Alternatively, the second-amount information can include the total number of horizontal beams in the antenna array that can emit and a sampling rate of the horizontal beams without directly indicating the second amount. Accordingly, the UE determines the horizontal beams to communicate with the UE in accordance with the total number of horizontal beams and the sampling rate of the horizontal beams.

Furthermore, similar to the information on the total number of APs, the horizontal number information and the vertical number information, the first-amount information and the second-amount information may be periodically or aperiodically notified to the UE, which is connected to the radio base station, by RRC signaling. Alternatively, the first-amount information and the second-amount information may be notified by a triggered physical layer signaling.

The precoding matrix generating method according to the present embodiment can be applied to an antenna array arranged by a different method. For example, this method can applied also to a two-dimensional antenna array, in addition to a one-dimensional antenna array. With the assumption that there is no need to change the generating process of the precoding matrix in the UE, the method of the present embodiment provides the possibility of the radio base station adjusting the antenna arrangement in accordance with actual need.

Figure 2:
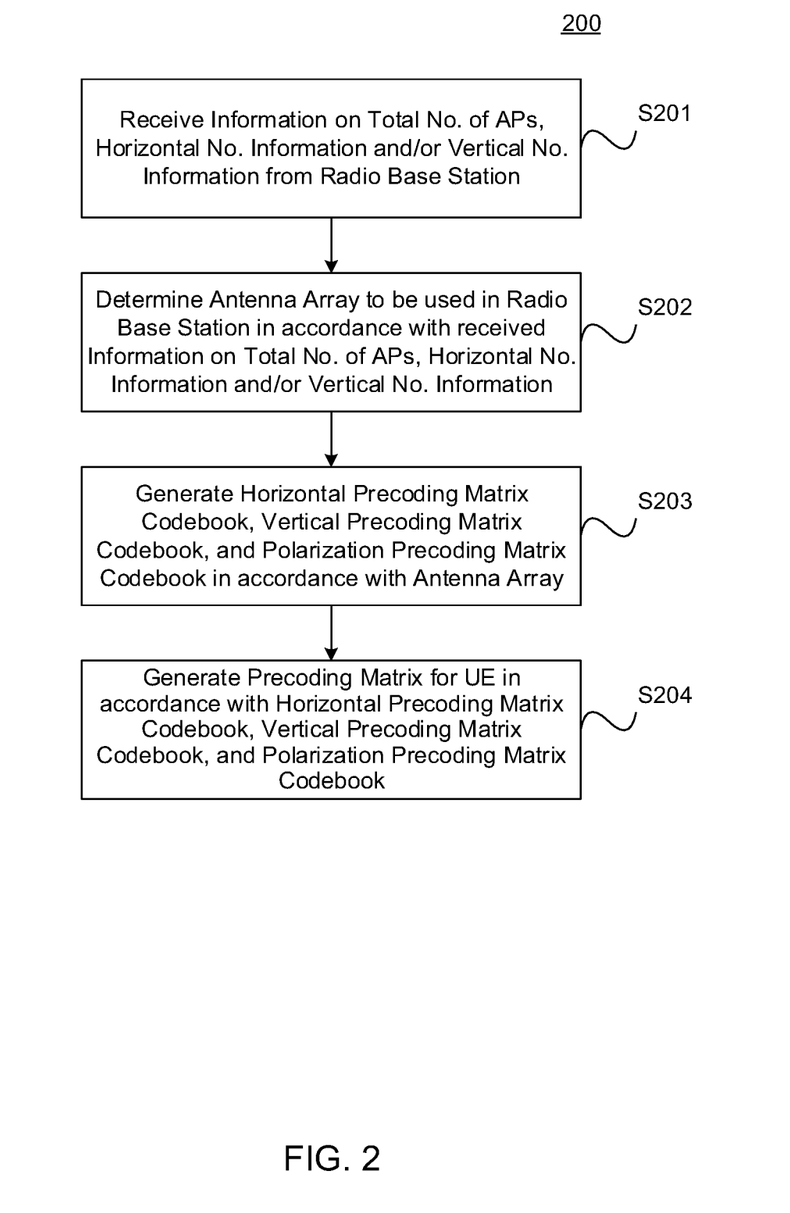
FIG. 2 is a flowchart of a method of generating a precoding matrix, according to another embodiment of the present invention.

FIG. 2 is a flowchart describing a precoding matrix generating method 200, according to the another embodiment of the present invention. The precoding matrix generating method 200 can be applied to a mobile station (i.e., a UE). In the embodiment of the present invention, a UE is connected to a radio base station, which is provided with an antenna array. Hereinbelow, the precoding matrix generating method 200, according to the embodiment of the present invention, will be described with reference to FIG. 2.

As shown in FIG. 2, in step S201, information on the total number of APs, horizontal number information and vertical number information are received from the radio base station. The information on the total number of antenna ports indicates the total number of antenna ports of the antenna array. The horizontal number information indicates the number of antenna ports in the horizontal dimension of the antenna array. The vertical number information indicates the number of antenna ports in the vertical dimension of the antenna array. Furthermore, in step S202, the antenna array used in the radio base station is determined in accordance with the received information on the total number of antenna ports, and the horizontal number information and/or the vertical number information.

According to an example of the present invention, upon the horizontal number information and the vertical number information being received in step S201, in step S202, the antenna array of the radio base station is directly determined in accordance with the horizontal number information and the vertical number information.

Furthermore, according to another example of the present invention, upon one of the horizontal number information and the vertical number information being received in step S201, in step S202, first the other of the horizontal number information and the vertical number information is obtained in accordance with one of the received information on the total number of APs, the horizontal number information and the vertical number information, and subsequently, the antenna array of the radio base station is determined in accordance with the horizontal number information and the vertical number information. For example, in the case where information on the total number of APs is received as "8" and horizontal number information is received as "4" in step S201, step S202 first determines that the number of APs in the vertical dimension of the antenna array should be "2", in accordance with the information on the total number of APs being "8" and the horizontal number information being "4", in other words, the vertical number information is "2"; subsequently, it is determined that the antenna array of the radio base station is a 4×2 two-dimensional antenna array, in accordance with the horizontal number information and the vertical number information.

In step S203, the horizontal precoding matrix codebook, the vertical precoding matrix codebook and the polarization precoding matrix codebook are generated in accordance with the determined antenna array. As described above, the corresponding relationship between the precoding matrix codebook and the arrangement scheme of the antenna array in the radio base station may be preconfigured. In step S203, the UE generates, in accordance with the antenna array arrangement scheme that is determined in the radio base station, a precoding matrix codebook corresponding to this antenna array arrangement scheme. According to an example of the present invention, the preconfigured precoding matrix codebook is configured from the horizontal precoding matrix codebook, the vertical precoding matrix codebook and the polarization precoding matrix codebook, which are mapped to the arrangement scheme of the antenna array. Optionally, the horizontal precoding matrix codebook, the vertical precoding matrix codebook and the polarization precoding matrix codebook may be a discrete fourier transform (DFT) form of vector.

[Formula 1]

For example, the vertical precoding codebook $u_m^M$ is generated in accordance with the following formula (1):

$$u_m^M = [1 \; e^{\{\frac{j2\pi m}{B}\}} \; \ldots \; e^{\{\frac{j2(M-1)\pi m}{B}\}}]^T, \quad (1)$$

wherein

M designates the number of antenna ports in the vertical dimension of the antenna array, namely, the first amount indicated by the first-amount information, B designates the resolving power in the vertical dimension of the antenna array of the radio base station, namely, the number of vertical beams for the radio base station to communicate with the UE, m designates the vertical precoding index, and M, B and m are integers greater than zero. The UE determines the value m in the precoding matrix used therein by detecting information emitted from the radio base station.

[Formula 2]

Furthermore, the horizontal precoding matrix codebook $w_n^N$ is generated in accordance with the following formula (2):

$$w_n^N = [1 \ e^{\{\frac{j2\pi n}{C}\}} \ \ldots \ e^{\{\frac{j2(N-1)\pi n}{C}\}}]^T, \qquad (2)$$

wherein

N designates the number of antenna ports in the horizontal dimension of the antenna array, namely, the second amount indicated by the second-amount information, C designates the resolving power in the horizontal dimension of the antenna array of the radio base station, namely, the number of horizontal beams for the radio base station to communicate with the UE, n designates the horizontal precoding index, and N, C and n are integers greater than zero. The UE determines the value n in the precoding matrix used therein by detecting information emitted from the radio base station.

[Formula 3]

Furthermore, the polarization precoding matrix codebook $\varphi_k$ is generated in accordance with the following formula (3):

$$\varphi_k = e^{\{\frac{j\pi k}{2}\}}, \qquad (3)$$

wherein k designates the polarization precoding index, wherein k may be 1 or 2. The UE determines the value k in accordance with a polarization scheme in a signal emitted from the antenna array.

[Formula 4]

According to an example of the present invention, in the case where the channel matrix rank is 1, a precoding matrix codebook $w_{m,n,k}$ is generated in accordance with the following formula (4):

$$W_{m,n,k} = \frac{1}{\sqrt{2MN}} \begin{bmatrix} v_{m,n} \\ \varphi_k v_{m,n} \end{bmatrix}, \qquad (4)$$

wherein $v_{m,n} = u_m^M \otimes w_n^N$, and

"$\otimes$" is the Kronecker Product.

[Formula 5]

Furthermore, in the case where the channel matrix rank is 2, namely, when two data streams are simultaneously transmitted, a precoding matrix codebook $w_{m,m',n,n',k}$ is generated in accordance with the following formula (5):

$$W_{m,m',n,n',k} = \frac{1}{\sqrt{2MN}} \begin{bmatrix} v_{m,n} & v_{m',n'} \\ \varphi_k v_{m,n} & -\varphi_k v_{m',n'} \end{bmatrix}, \qquad (5)$$

wherein m designates the first data stream vertical precoding index, n designates the first data stream horizontal precoding index, m' designates the second data stream vertical precoding index, and n' designates the second data stream horizontal precoding index.

Figure 3:
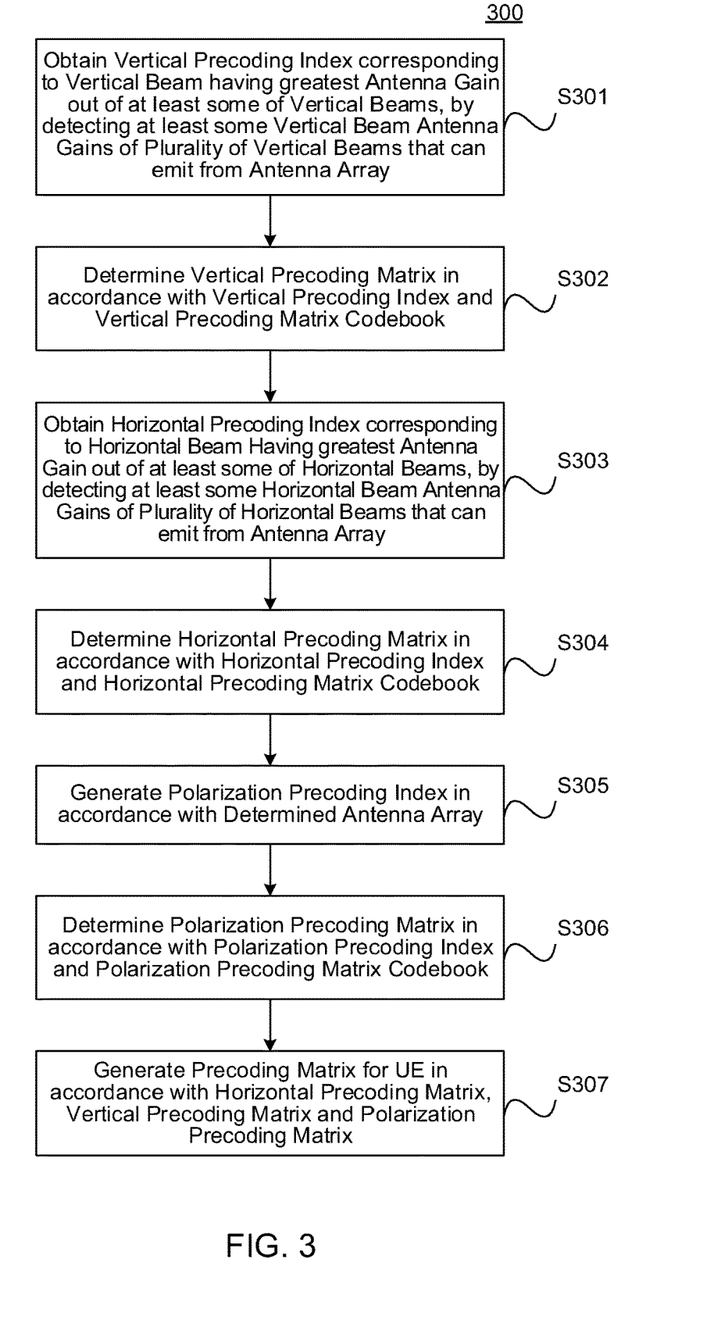
FIG. 3 is flowchart showing a method of generating a precoding matrix for a UE, according to the embodiment of the present invention.

Furthermore, in step S204, a precoding matrix is generated for the UE in accordance with the generated horizontal precoding matrix codebook, the vertical precoding matrix codebook, and the polarized precoding matrix codebook. Various methods of generating a precoding matrix for the UE, in accordance with the horizontal precoding matrix codebook, the vertical precoding matrix codebook and the polarization precoding matrix codebook, can be determined in accordance to need. FIG. 3 is a flowchart showing a precoding matrix generating method 300 for the UE, according to an example of the present invention. As shown in FIG. 3, in step S301, a vertical precoding index, corresponding to a vertical beam having greatest antenna gain out of at least one vertical beam, can be obtained by detecting at least one vertical beam antenna gain of a plurality of vertical beams that can emit from the antenna array. Furthermore, in step S302, a vertical precoding matrix can be determined according to the vertical precoding index and the vertical precoding matrix codebook.

According to an example of the present invention, an antenna array can emit a plurality of beams in the vertical dimension; in other words, a plurality of vertical beams can be emitted. The number of vertical beams that the antenna array, arranged by each scheme, can emit is prestored in the UE or the number of specified vertical beams that a radio base station can emit is notified to the UE. "B" in the above formula (1) may designate the number of determined vertical beams that an antenna array can emit. In such a case, in step S301, only the antenna gain of all of the plurality of vertical beams that can be emitted from the antenna array are detected, and the value "m" is determined in accordance with the vertical precoding index corresponding to the vertical beam having the greatest antenna gain out of all of the plurality of vertical beams that can be emitted from the antenna array. Furthermore, according to another example of the present invention, the radio base station determines, in accordance with predetermined information, only at least one vertical beam out of the plurality of vertical beams to use to transmit signals to the UE, and notifies the UE of the vertical beam(s) that is selected by the radio base station. In such a case, in another example of the present invention, in the method shown in FIG. 2 or 3, an additional step is included in which the first-amount information is received from the radio base station, and in which the first-amount information indicates the first amount of the vertical beam for transmitting to the UE out of the plurality of vertical beams. "B" in the above formula (1) may be the first amount indicated by the received first-amount information. In step S301, only the antenna gain of the first amount of vertical beams that can be emitted from the antenna array are detected, and the value "m" is determined in accordance with the vertical precoding index corresponding to the vertical beam having the greatest antenna gain out of the first amount of vertical beams that can be emitted from the antenna array. Hence, the operations that the UE perform can be simplified.

In the horizontal dimension, similar operations to the above-described operations performed in the vertical dimension can be carried out. As shown in FIG. 3, in step S303, a horizontal precoding index, corresponding to a horizontal beam having greatest antenna gain out of at least one horizontal beam, can be obtained by detecting at least one horizontal beam antenna gain of a plurality of horizontal beams that can emit from the antenna array. Furthermore, in step S304, a horizontal precoding matrix can be determined according to the horizontal precoding index and the horizontal precoding matrix codebook.

According to an example of the present invention, an antenna array can emit a plurality of beams in the horizontal dimension; in other words, a plurality of horizontal beams can be emitted. The number of horizontal beams that the antenna arrays, arranged by each scheme, can emit is pre-stored in the UE or the number of specified horizontal beams that a radio base station can emit is notified to the UE. "C" in the above formula (2) may designate the number of determined horizontal beams that an antenna array can emit. In such a case, in step S303, only the antenna gain of all of the plurality of horizontal beams that can be emitted from the antenna array are detected, and the value "n" is determined in accordance with the horizontal precoding index corresponding to the horizontal beam having the greatest antenna gain out of all of the plurality of horizontal beams that can be emitted from the antenna array. Furthermore, according to another example of the present invention, the radio base station determines, in accordance with predetermined information, only at least one horizontal beam out of the plurality of horizontal beams to use to transmit signals to the UE, and notifies the UE of the horizontal beam(s) that is selected by the radio base station. In such a case, in another example of the present invention, in the method shown in FIG. 2 or 3, an additional step is included in which the second-amount information is received from the radio base station, and in which the second-amount information indicates the second amount of the horizontal beam for transmitting to the UE out of the plurality of horizontal beams. "C" in the above formula (2) may be the second amount indicated by the received second-amount information. In step S303, only the antenna gain of the second amount of horizontal beams that can be emitted from the antenna array are detected, and the value "n" is determined in accordance with the horizontal precoding index corresponding to the horizontal beam having the greatest antenna gain out of the second amount of horizontal beams that can be emitted from the antenna array. Hence, the operations that the UE perform can be simplified.

In step S305, a polarization precoding index is generated in accordance with the determined antenna array. The polarization precoding index indicates the scheme by which polarization is performed in the UE. For example, when the UE performs horizontal polarization on a signal emitting from the antenna array, the value "k" in the above formula (3) may be "1", and when the UE performs vertical polarization on a signal emitting from the antenna array, the value "k" in the above formula (3) may be "2". Furthermore, in step S306, a polarization precoding matrix is generated in accordance with the polarization precoding index and the polarization precoding matrix codebook.

Lastly, in step S307, a precoding matrix is generated for the UE in accordance with the horizontal precoding matrix, the vertical precoding matrix and the polarization precoding matrix. For example, the precoding matrix for the UE is generated according to the above formula (4) or (5).

It should be noted that the steps of the method shown in FIG. 3 are not necessarily carried out in the shown order. Some of the steps may be carried out in reverse order or in parallel. For example, the steps of detecting and generating the vertical precoding index, the steps of detecting and generating the horizontal precoding index, and the steps of detecting and generating the polarization precoding index can be carried out concurrently.

Furthermore, according to an example of the present invention, upon the horizontal precoding index, the vertical precoding index and the polarization precoding index being generated, the generated horizontal precoding index, vertical precoding index and polarization precoding index are transmitted to the radio base station in order for the radio base station to generate a precoding matrix for the UE.

The precoding matrix generating method according to the present embodiment can be applied to an antenna array arranged by a different method. For example, this method can applied also to a two-dimensional antenna array, in addition to a one-dimensional antenna array. Accordingly, in the precoding matrix generating method of the present embodiment, the UE can flexibly generate a codebook in accordance with the antenna arrangement in the radio base station, so that it is not necessary to determine a method for generating a precoding matrix, in advance in the UE, for each different antenna arrangement.

Figure 4:
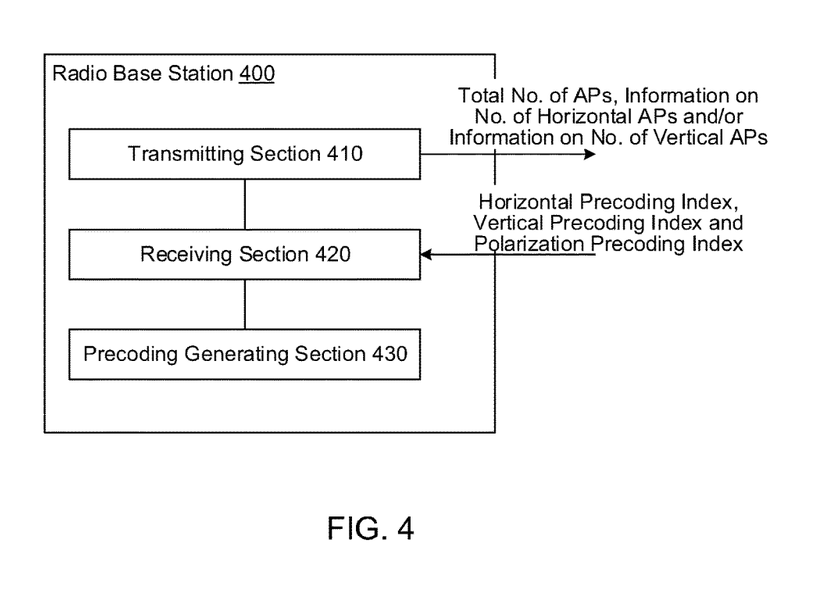
FIG. 4 is a typical configuration block diagram showing a radio base station according to an embodiment of the present invention.

The following is a description of the radio base station according to an embodiment of the present invention while referring to FIG. 4. FIG. 4 is a typical configuration block diagram showing a radio base station 400 according to an embodiment of the present invention. An antenna array (not shown in the drawings) is provided in the radio base station 400. Furthermore, as shown in FIG. 4, the radio base station 400 of the present embodiment includes a transmitting section 410, a receiving section 420, and a precoding generating section 430. Each section of the radio base station 400 carries out each step/function of the precoding matrix generating method 100 that is shown in FIG. 1. Hence, only the major components of the radio base station 400 will be described hereinbelow, and a detailed description connected with FIG. 1 is omitted here.

The transmitting section 410 transmits information on the total number of antenna ports (APs), horizontal number information and vertical number information to the UE. The information on the total number of antenna ports indicates the total number of antenna ports of the antenna array. The horizontal number information indicates the number of antenna ports in the horizontal dimension of the antenna array. The vertical number information indicates the number of antenna ports in the vertical dimension of the antenna array.

The horizontal number information may be the number of antenna ports in the horizontal dimension of the antenna array, and the vertical number information may be the number of antenna ports in the vertical dimension of the antenna array. According to an example of the present invention, the transmitting section 410 transmits the information on the total number of APs, the horizontal number information and the vertical number information to the UE. According to another example of the present invention, the transmitting section 410 may transmit the information on the total number of APs, and one of the horizontal number information and the vertical number information to the UE. The UE, first of all, calculates the other of the horizontal number information and the vertical number information in accordance with the received information, and determines the antenna arrangement of the radio base station.

According to an example of the present invention, the transmitting section 410 notifies the information on the total number of APs and the horizontal number information and/or the vertical number information periodically or aperiodically via RRC signaling to the UE, which is connected to the radio base station. For example, the information elements (IEs) are increased in "CSI-Config" of the RRC signaling in order to notify the above information. However, since the radio base station normally transmits the RRC signaling at a period of 100 ms, which is a long transmission period, sometimes a case arises where the UE's needs cannot be timely met. In view of this issue, according to one example of the present invention, the transmitting section 410 may notify the information on the total number of APs and the horizontal number information and/or the vertical number information by triggered physical layer signaling. Since this physical layer signaling can be triggered as necessary, the radio base station has more flexibility in notifying the UE. For example, the above information can be notified in DCI physical layer signaling which is triggered for A-CSI.

Furthermore, alternatively, the horizontal number information and/or the vertical number information may be release information of a communication standard that is used by the radio base station. The UE determines an antenna array arrangement used in a radio base station in accordance with the release information of the communication standard. Optionally, the transmitting section 410 notifies the UE of the information on the total number of APs of the radio base station 400 and the release information of the communication standard used therein, in accordance with a new PMI feedback configuration signaling.

The corresponding relationship between the precoding matrix codebook and the arrangement scheme of the antenna array in the radio base station may be preconfigured. The UE generates, in accordance with the antenna array arrangement scheme that is determined in the radio base station, a precoding matrix codebook corresponding to this antenna array arrangement scheme.

Furthermore, the UE, in accordance with the precoding matrix codebook, generates the precoding matrix to be used in the UE, and feeds back an indicated precoding matrix index to the radio base station; accordingly, the radio base station determines a precoding matrix for the UE to use in accordance with this index. In the radio base station 400 shown in FIG. 4, the receiving section 420 receives a horizontal precoding index, a vertical precoding index, and a polarization precoding index from the UE. Furthermore, the precoding generating section 430 generates a precoding matrix for the UE in accordance with the received horizontal precoding index, the vertical precoding index and the polarization precoding index. According to an example of the present invention, the precoding matrix codebooks that are preconfigured in the radio base station 400 and the UE, respectively, are generated in accordance with a horizontal precoding matrix codebook, a vertical precoding matrix codebook, and a polarization precoding matrix codebook. A precoding matrix is generated by the horizontal precoding index, the vertical precoding index and the polarization precoding index respectively indicating, in the UE, a horizontal precoding matrix, a vertical precoding matrix and a polarization precoding matrix that are selected from the horizontal precoding matrix codebook, the vertical precoding matrix codebook and the polarization precoding matrix codebook when the precoding matrix is generated.

Furthermore, according to an example of the present invention, an antenna array of the radio base station 400 can emit a plurality of beams in the vertical dimension; in other words, a plurality of vertical beams can be emitted. The vertical precoding index received in the receiving section 420 may be an index for a vertical precoding matrix, corresponding to a vertical beam having the greatest antenna gain out of a plurality of vertical beams detected by the UE. Optionally, the radio base station 400 can determine, in accordance with predetermined information, only at least one vertical beam out of the plurality of vertical beams to use to transmit signals to the UE. In this case, it is desirable for the transmitting section 410 to notify the UE of the beam selected by the radio base station, whereby operations to be carried out by the UE can be simplified due to the UE only examining the vertical beam that is selected by the radio base station.

Specifically, the radio base station 400 further includes a vertical beam selecting section configured to determine a first amount of vertical beams, for transmission with the UE, out of a plurality of vertical beams that can be emitted in an antenna array. Furthermore, the radio base station 400 notifies the UE of first-amount information that indicates the first amount, and accordingly, the UE determines the vertical precoding index in accordance with the first amount of vertical beams. The first-amount information may be the determined first amount of vertical beams for communicating with the UE. Alternatively, the first-amount information can include the total number of vertical beams in the antenna array that can emit and a sampling rate of the vertical beams without directly indicating the first amount. Accordingly, the UE determines the vertical beams to communicate with the UE in accordance with the total number of vertical beams and the sampling rate of the vertical beams.

Furthermore, similar to the vertical beams, according to another example of the present invention, an antenna array of the radio base station 400 can emit a plurality of beams in the horizontal dimension; in other words, a plurality of horizontal beams can be emitted. The horizontal precoding index received in the receiving section 420 may be an index for a horizontal precoding matrix, corresponding to a horizontal beam having the greatest antenna gain out of a plurality of horizontal beams detected by the UE. Optionally, the radio base station 400 can determine, in accordance with predetermined information, only at least one horizontal beam out of the plurality of horizontal beams to use to transmit signals to the UE. In this case, it is desirable for the transmitting section 410 to notify the UE of the beam selected by the radio base station, whereby operations to be carried out by the UE can be simplified due to the UE only examining the horizontal beam that is selected by the radio base station.

Specifically, the radio base station 400 includes a horizontal beam selecting section configured to determine a second amount of horizontal beams, for transmission with the UE, out of a plurality of horizontal beams that can be emitted in an antenna array; and the transmitting section 410 notifies the UE of second-amount information that indicates the second amount, and accordingly, the UE determines the horizontal precoding index in accordance with the second amount of horizontal beams. The second-amount information may be the determined second amount of horizontal beams for communicating with the UE. Alternatively, the second-amount information can include the total number of horizontal beams in the antenna array that can emit and a sampling rate of the horizontal beams without directly indicating the second amount. Accordingly, the UE determines the horizontal beams to communicate with the UE in accordance with the total number of horizontal beams and the sampling rate of the horizontal beams.

Furthermore, similar to the information on the total number of APs, the horizontal number information and the vertical number information, the transmitting section may periodically or aperiodically notify the first-amount information and the second-amount information to the UE that is connected to the radio base station by RRC signaling. Alternatively, the first-amount information and the second-amount information may be notified by a triggered physical layer signaling.

According to the radio base station of the present embodiment, precoding matrix codebooks and precoding matrixes used by the UE can be flexibly generated for antenna arrays having different arrangement schemes. Accordingly, the radio base station can adjust the antenna arrangement in accordance with actual need, and there is no need to change the generating process of the precoding matrix in the UE.

Figure 5:
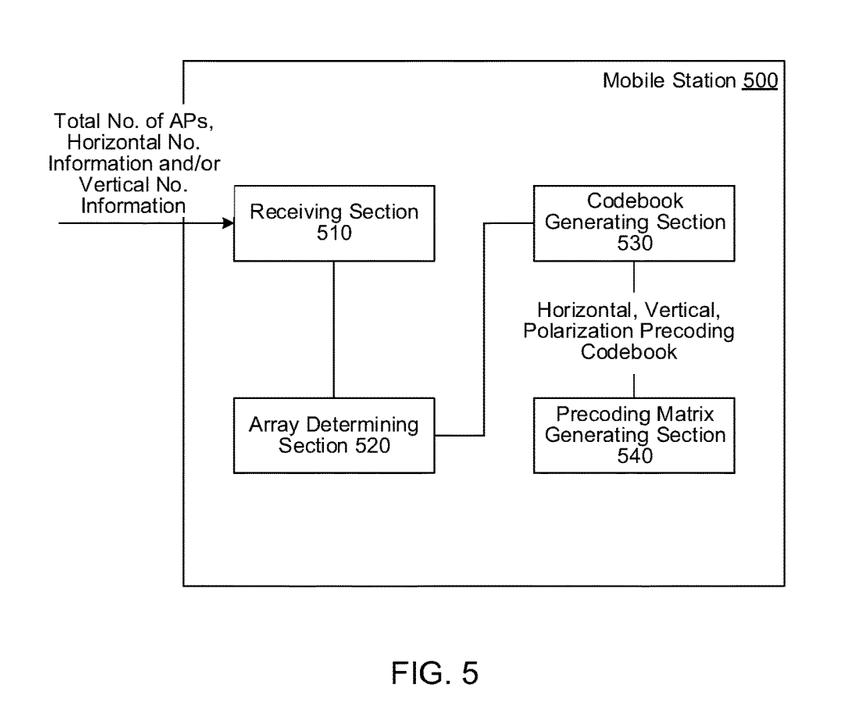
FIG. 5 is a typical configuration block diagram showing a mobile station according to an embodiment of the present invention.

The following is a description of the mobile station (i.e., UE) of an embodiment of the present invention, with reference to FIG. 5. FIG. 5 is a typical configuration block diagram showing a mobile station 500 according to an embodiment of the present invention. The mobile station 500 is connected to a radio base station, in which an antenna array is arranged. As shown in FIG. 5, the mobile station 500 of the present embodiment includes a receiving section 510, an array determining section 520, a codebook generating section 530, and a precoding matrix generating section 540. Each section of the mobile station 500 carries out each step/function of the precoding matrix generating method 200 that is shown in FIG. 2. Hence, only the major components of the mobile station 500 will be described hereinbelow, and a detailed description connected with FIG. 2 is omitted here.

The receiving section 510 receives information on the total number of APs, horizontal number information and vertical number information from the radio base station. The information on the total number of APs indicates the total number of antenna ports of the antenna array. The horizontal number information indicates the number of antenna ports in the horizontal dimension of the antenna array. The vertical number information indicates the number of antenna ports in the vertical dimension of the antenna array. Furthermore, the array determining section 520 determines the antenna array used in the radio base station in accordance with the received information on the total number of antenna ports, and the horizontal number information and/or the vertical number information.

According to an example of the present invention, upon the receiving section 510 receiving the horizontal number information and the vertical number information, the array determining section 520 directly determines the antenna array of the radio base station in accordance with the horizontal number information and the vertical number information. Furthermore, according to another example of the present invention, upon the receiving section 510 receiving one of the horizontal number information and the vertical number information, the array determining section 520 first obtains the other of the horizontal number information and the vertical number information in accordance with one of the received information on the total number of APs, the horizontal number information and the vertical number information, and subsequently, the antenna array of the radio base station is determined in accordance with the horizontal number information and the vertical number information.

The codebook generating section 530 generates the horizontal precoding matrix codebook, the vertical precoding matrix codebook and the polarization precoding matrix codebook in accordance with the determined antenna array. As described above, the corresponding relationship between the precoding matrix codebook and the arrangement scheme of the antenna array in the radio base station may be preconfigured. The codebook generating section 530 generates, in accordance with the antenna array arrangement scheme that is determined in the radio base station, a precoding matrix codebook corresponding to this antenna array arrangement scheme. According to an example of the present invention, the preconfigured precoding matrix codebook is configured from the horizontal precoding matrix codebook, the vertical precoding matrix codebook and the polarization precoding matrix codebook, which are mapped to the arrangement scheme of the antenna array. Optionally, the horizontal precoding matrix codebook, the vertical precoding matrix codebook and the polarization precoding matrix codebook may be a discrete fourier transform (DFT) form of vector. For example, as described above, a precoding matrix codebook, which is mapped to the arrangement scheme of the antenna array, is generated in accordance with formulas (1) through (5).

Figure 6:
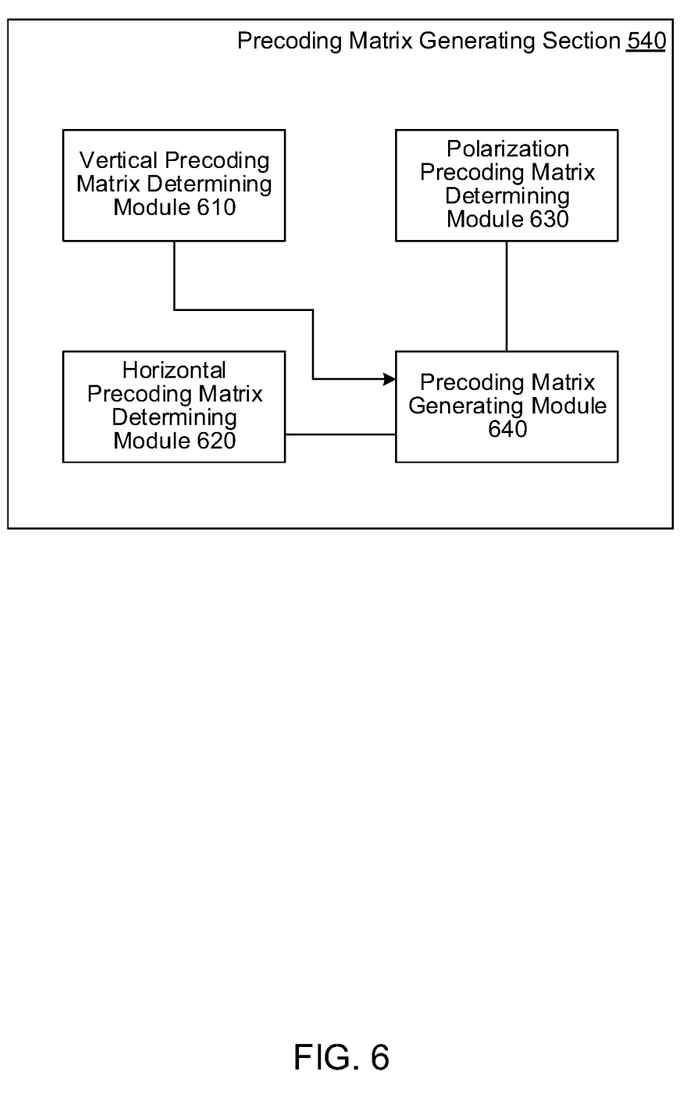
FIG. 6 is a typical configuration block diagram showing precoding matrix generating section, according to an embodiment of the present invention.

Furthermore, the precoding matrix generating section 540 generates a precoding matrix for the UE in accordance with the generated horizontal precoding matrix codebook, the vertical precoding matrix codebook, and the polarized precoding matrix codebook. The precoding matrix generating section 540 determines various methods of generating a precoding matrix for the UE, in accordance with the horizontal precoding matrix codebook, the vertical precoding matrix codebook and the polarization precoding matrix codebook, in accordance to need. FIG. 6 is a typical configuration block diagram showing precoding matrix generating section 540, according to an embodiment of the present invention. As shown in FIG. 6, precoding matrix generating section 540 includes a vertical precoding matrix determining module 610, a horizontal precoding matrix determining module 620, a polarization precoding matrix determining module 630, and a precoding matrix generating module 640.

Specifically, the mobile station 500 includes a detecting section. The detecting section detects at least one vertical beam antenna gain of a plurality of vertical beams that can emit from the antenna array, whereby a vertical precoding index, corresponding to a vertical beam having greatest antenna gain out of at least one vertical beam, can be obtained. Furthermore, the vertical precoding matrix determining module 610 determines a vertical precoding matrix according to the vertical precoding index and the vertical precoding matrix codebook.

According to an example of the present invention, an antenna array can emit a plurality of beams in the vertical dimension; in other words, a plurality of vertical beams can be emitted. The number of vertical beams that the antenna array, arranged by each scheme, can emit is prestored in the UE or the number of specified vertical beams that a radio base station can emit is notified to the UE. "B" in the above formula (1) may designate the number of determined vertical beams that an antenna array can emit. In such a case, the antenna gain of all of the plurality of vertical beams that can be emitted from the antenna array are detected by the detecting section, and the value "m" is determined in accordance with the vertical precoding index corresponding to the vertical beam having the greatest antenna gain out of all of the plurality of vertical beams that can be emitted from the antenna array. Furthermore, according to another example of the present invention, the radio base station determines, in accordance with predetermined information, only at least one vertical beam out of the plurality of vertical beams to use to transmit signals to the UE, and notifies the UE of the vertical beam(s) that is selected by the radio base station. In such a case, in another example of the present invention, the receiving section 510 also receives first-amount information from the radio base station, and in which the first-amount information indicates the first amount of the vertical beam for transmitting to the UE out of the plurality of vertical beams. "B" in the above formula (1) may be the first amount indicated by the received first-amount information. The detecting section detects only the antenna gain of the first amount of vertical beams that can be emitted from the antenna array, and the value "m" is determined in accordance with the vertical precoding index corresponding to the vertical beam having the greatest antenna gain out of the first amount of vertical beams that can be emitted from the antenna array. Hence, the operations that the UE perform can be simplified.

The horizontal precoding matrix determining module 620, in the horizontal dimension, can carry out similar operations to the above-described operations performed in the vertical dimension by the vertical precoding matrix determining module 610. Specifically, a horizontal precoding index, corresponding to a horizontal beam having greatest antenna gain out of at least one horizontal beam, can be obtained by the detecting section detecting at least one horizontal beam antenna gain of a plurality of horizontal beams that can emit from the antenna array. Furthermore, the horizontal precoding matrix determining module 620 determines a horizontal precoding matrix according to the horizontal precoding index and the horizontal precoding matrix codebook.

According to an example of the present invention, an antenna array can emit a plurality of beams in the horizontal dimension; in other words, a plurality of horizontal beams can be emitted. The number of horizontal beams that the antenna arrays, arranged by each scheme, can emit is pre-stored in the UE or the number of specified horizontal beams that a radio base station can emit is notified to the UE. "C" in the above formula (2) may designate the number of determined horizontal beams that an antenna array can emit. In such a case, the detection section detects only the antenna gain of all of the plurality of horizontal beams that can be emitted from the antenna array, and the value "n" is determined in accordance with the horizontal precoding index corresponding to the horizontal beam having the greatest antenna gain out of all of the plurality of horizontal beams that can be emitted from the antenna array. Furthermore, according to another example of the present invention, the radio base station determines, in accordance with predetermined information, only at least one horizontal beam out of the plurality of horizontal beams to use to transmit signals to the UE, and notifies the UE of the horizontal beam(s) that is selected by the radio base station. In such a case, in another example of the present invention, the receiving section 510 also receives the second-amount information from the radio base station. The second-amount information indicates the second amount of the horizontal beam for transmitting to the UE out of the plurality of horizontal beams. "C" in the above formula (2) may be the second amount indicated by the received second-amount information. The detecting section detects only the antenna gain of the second amount of horizontal beams that can be emitted from the antenna array, and the value "n" is determined in accordance with the horizontal precoding index corresponding to the horizontal beam having the greatest antenna gain out of the second amount of horizontal beams that can be emitted from the antenna array. Hence, the operations that the UE perform can be simplified.

Furthermore, the detecting section generates a polarization precoding index in accordance with the determined antenna array. The polarization precoding index indicates the scheme by which polarization is performed in the UE. For example, when the UE performs horizontal polarization on a signal emitting from the antenna array, the value "k" in the above formula (3) may be "1", and when the UE performs vertical polarization on a signal emitting from the antenna array, the value "k" in the above formula (3) may be "2". Furthermore, the polarization precoding matrix determining module 630 generates a polarization precoding matrix in accordance with the determined antenna array.

Furthermore, the precoding matrix generating module 640 generates a precoding matrix for the UE in accordance with the horizontal precoding matrix, the vertical precoding matrix and the polarization precoding matrix. For example, the precoding matrix generating module 640 generates the precoding matrix for the mobile station according to the above formula (4) or (5).

Furthermore, according to an example of the present invention, the mobile station 500 shown in FIG. 5 includes a transmitting section. Upon the horizontal precoding index, the vertical precoding index and the polarization precoding index being generated, the transmitting section transmits the generated horizontal precoding index, vertical precoding index and polarization precoding index to the radio base station in order for the radio base station to generate a precoding matrix for the mobile station.

The mobile station according to the present embodiment can flexibly generate a codebook in accordance with the antenna arrangement in the radio base station, so that it is not necessary to determine a method for generating a precoding matrix, in advance in the mobile station, for each different antenna arrangement.

The radio base station 400 and the mobile station 500 may be achieved with hardware, may be achieved with a software module performed by a processor, or may be achieved by a combination of both.

The software module may be provided in a storage medium of a desired format, for example, RAM (Random Access Memory), flash memory, ROM (Read Only Memory), EPROM (Erasable Programmable ROM), EEPROM (Electrically Erasable Programmable ROM), a resistor, a hard disk, a removable disk, or a CD-ROM.

This storage medium is connected to a processor in order for the processor to write information on this storage medium and to read information from this storage medium. This storage medium may be provided in the processor. This storage medium and the processor may be provided in an ASIC. Such a ASIC may be provided in each of the radio base station 400 and in the mobile station 500. The storage medium and the processor may be provided in the radio base station 400 and the mobile station 500 as discreet components.

Hence, the present invention has been described in detail using the above embodiments; one skilled in the art would understand that the present invention is not limited to the described embodiments. The present invention can be modified or changed, within the spirit and scope of the present invention of the claims. Accordingly, the descriptions in the specification are strictly explanatory, and do not limit the scope of the present invention.

The disclosure of Chinese Patent Application No. 201510166472.9, filed on Apr. 9, 2015, is incorporated herein by reference in its entirety.

The invention claimed is:

1. A mobile station, which carries out communication using a plurality of antenna ports, the mobile station comprising:
    a receiving section configured to receive, from a radio base station, first-amount information that indicates a number of antenna ports in a first dimension, and second-amount information that indicates a number of antenna ports in a second dimension; and
    a transmitting section configured to transmit, to the radio base station, a precoding matrix codebook index that is obtained using the first-amount information and/or the second-amount information,
    wherein the receiving section receives first sampling rate information that indicates a sampling rate of a beam transmitted in the first dimension, and second sampling rate information that indicates a sampling rate of a beam transmitted in the second dimension, and wherein the precoding matrix codebook index is obtained using the first sampling rate information and/or the second sampling rate information, in addition to using the first-amount information and/or the second-amount information.

2. The mobile station according to claim 1, wherein the transmitting section transmits a first precoding matrix codebook index that corresponds to the first dimension, a second precoding matrix codebook index that corresponds to the second dimension, and a third precoding matrix codebook index.

3. The mobile station according to claim 2, wherein the first precoding matrix codebook index is a horizontal precoding matrix codebook index, wherein the second precoding matrix codebook index is a vertical precoding matrix codebook index, and wherein the third precoding matrix codebook index is a polarization precoding matrix codebook index.

4. The mobile station according to claim 2, wherein the receiving section selectively receives at least one beam out of a plurality of beams, with which transmission is possible with the radio base station.

5. The mobile station according to claim 2, wherein the first dimension is a horizontal dimension of an antenna array of the radio base station, and the second dimension is a vertical dimension of an antenna array of the radio base station.

6. The mobile station according to claim 1, wherein the receiving section selectively receives at least one beam out of a plurality of beams, with which transmission is possible with the radio base station.

7. The mobile station according to claim 6, wherein the first dimension is a horizontal dimension of an antenna array of the radio base station, and the second dimension is a vertical dimension of an antenna array of the radio base station.

8. The mobile station according to claim 1, wherein the first dimension is a horizontal dimension of an antenna array of the radio base station, and the second dimension is a vertical dimension of an antenna array of the radio base station.

9. A radio base station, which carries out communication with a mobile station using a plurality of antenna ports, the radio base station comprising:

a transmitting section configured to transmit, to the mobile station, first-amount information that indicates a number of antenna ports in a first dimension, second-amount information that indicates a number of antenna ports in a second dimension, first sampling rate information that indicates a sampling rate of a beam transmitted in the first dimension, and second sampling rate information that indicates a sampling rate of a beam transmitted in the second dimension; and a receiving section configured to receive, from the mobile station, a precoding matrix codebook index that is obtained by the mobile station using the first-amount information and/or the second-amount information and the first sampling rate information and/or the second sampling rate information.

10. A radio communication method of a mobile station which carries out communication using a plurality of antenna ports, the radio communication method comprising:

receiving, from a radio base station, first-amount information that indicates a number of antenna ports in a first dimension, and second-amount information that indicates a number of antenna ports in a second dimension; and transmitting, to the radio base station, a precoding matrix codebook index that is obtained using the first-amount information and/or the second-amount information, wherein the mobile station receives first sampling rate information that indicates a sampling rate of a beam transmitted in the first dimension, and second sampling rate information that indicates a sampling rate of a beam transmitted in the second dimension, and wherein the precoding matrix codebook index is obtained using the first sampling rate information and/or the second sampling rate information, in addition to using the first-amount information and/or the second-amount information.

* * * * *